(12) United States Patent
Shirani et al.

(10) Patent No.: US 11,230,907 B2
(45) Date of Patent: Jan. 25, 2022

(54) HORIZONTAL CONNECTOR SYSTEM AND METHOD

(71) Applicant: OneSubsea IP UK Limited, London (GB)

(72) Inventors: Alireza Shirani, Houston, TX (US); John A. Roberts, Houston, TX (US); Tommy D. Polasek, Spring, TX (US); Akshay Kalia, Houston, TX (US); Ted Mercer, Cypress, TX (US); Phillip M. Theriot, Cypress, TX (US)

(73) Assignee: OneSubsea IP UK Limited, London (GB)

(*) Notice: Subject to any disclaimer, the term of this patent is extended or adjusted under 35 U.S.C. 154(b) by 131 days.

(21) Appl. No.: 16/520,054

(22) Filed: Jul. 23, 2019

(65) Prior Publication Data
US 2021/0025264 A1 Jan. 28, 2021

(51) Int. Cl.
*F16L 1/26* (2006.01)
*E21B 41/00* (2006.01)
*E21B 43/013* (2006.01)

(52) U.S. Cl.
CPC ........ *E21B 41/0007* (2013.01); *E21B 43/013* (2013.01); *F16L 1/26* (2013.01)

(58) Field of Classification Search
CPC ...... E21B 41/0007; E21B 43/013; F16L 1/26; F16L 23/02; F16L 1/09; F16L 1/10
See application file for complete search history.

(56) References Cited

U.S. PATENT DOCUMENTS

| 4,878,783 | A | * | 11/1989 | Baugh | E21B 33/0355 |
| | | | | | 405/169 |
| 6,148,921 | A | | 11/2000 | Valla et al. | |
| 7,040,407 | B2 | | 5/2006 | Jennings et al. | |
| 7,793,724 | B2 | | 9/2010 | Daniel et al. | |
| 8,261,837 | B2 | | 9/2012 | Leonard et al. | |

(Continued)

FOREIGN PATENT DOCUMENTS

| EP | 2486315 A1 * | 8/2012 | ................ F16L 1/26 |
| EP | 2486315 A1 | 8/2012 | |

(Continued)

OTHER PUBLICATIONS

"Standard Subsea Connection Systems," brochure, 12 pages, published by OneSubsea, Houston, Texas, dated 2017.

(Continued)

*Primary Examiner* — Lee A Holly
(74) *Attorney, Agent, or Firm* — Eileen Pape

(57) ABSTRACT

An apparatus includes a flowline connector having an inboard pipe and an outboard assembly. The outboard assembly includes a frame and an outboard pipe moveable within the frame to allow the outboard pipe to be moved toward the inboard pipe. The outboard assembly also includes a profile pipe in which the outboard pipe is received, and the profile pipe and the outboard pipe are connected to move together. The profile pipe includes at least one guide to change pitch or yaw of the outboard pipe to direct the outboard pipe toward alignment with the inboard pipe as the outboard pipe is moved within the frame toward the inboard pipe. Additional systems, devices, and methods are also disclosed.

13 Claims, 12 Drawing Sheets

(56) References Cited

U.S. PATENT DOCUMENTS

| | | | |
|---|---|---|---|
| 8,267,179 B2 * | 9/2012 | Butcher | E21B 43/013 166/341 |
| 8,464,797 B2 | 6/2013 | Singh et al. | |
| 8,550,170 B2 | 10/2013 | McHugh et al. | |
| 8,720,581 B2 | 5/2014 | Berg | |
| 8,794,336 B2 | 8/2014 | Bekkevold | |
| 9,217,315 B2 | 12/2015 | Møgedal | |
| 9,890,615 B1 | 2/2018 | Shirani et al. | |
| 10,100,618 B2 | 10/2018 | Sales et al. | |
| 10,132,155 B2 | 11/2018 | Coble et al. | |
| 2004/0007362 A1 | 1/2004 | Rodgers et al. | |
| 2011/0005764 A1 | 1/2011 | Bekkevold | |
| 2012/0138307 A1 | 6/2012 | Berg | |
| 2014/0305654 A1 * | 10/2014 | Lugo | E21B 43/013 166/344 |
| 2015/0083943 A1 | 3/2015 | Shah et al. | |
| 2015/0176744 A1 | 6/2015 | Glassman et al. | |
| 2015/0204167 A1 | 7/2015 | Skeels et al. | |
| 2017/0159410 A1 | 6/2017 | Ceccon De Azevedo et al. | |
| 2017/0241243 A1 | 8/2017 | Gomes Martins et al. | |
| 2017/0328163 A1 | 11/2017 | Shirani et al. | |
| 2018/0156026 A1 | 6/2018 | Kalia et al. | |
| 2018/0231158 A1 | 8/2018 | Shirani et al. | |
| 2018/0274351 A1 | 9/2018 | Zaragoza Labes et al. | |
| 2018/0371877 A1 | 12/2018 | Zaragoza Labes et al. | |
| 2019/0055822 A1 | 2/2019 | Cargol, Jr. et al. | |

FOREIGN PATENT DOCUMENTS

| | | |
|---|---|---|
| WO | 2016038396 A1 | 3/2016 |
| WO | 2019011598 A1 | 1/2019 |

OTHER PUBLICATIONS

International Search Report and Written Opinion issued in International Patent Application No. PCT/US2020/043051 dated Oct. 30, 2020; 14 pages.

* cited by examiner

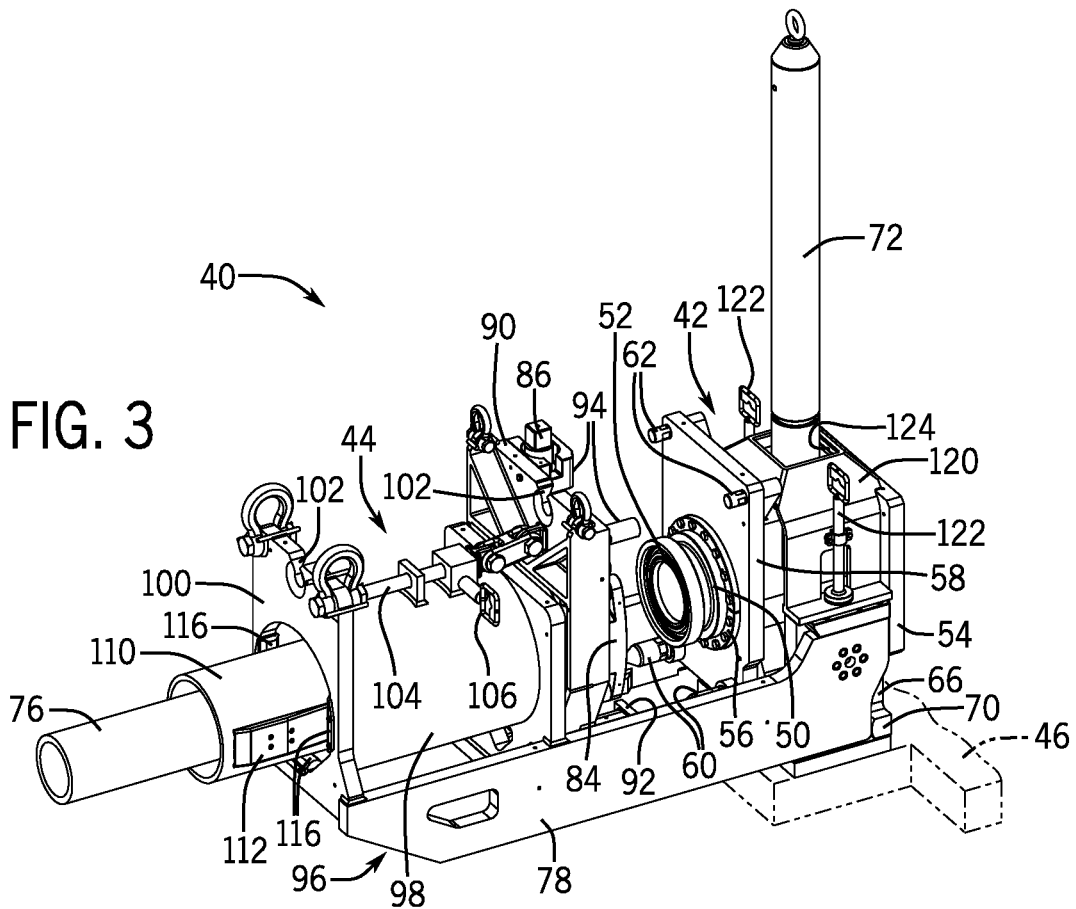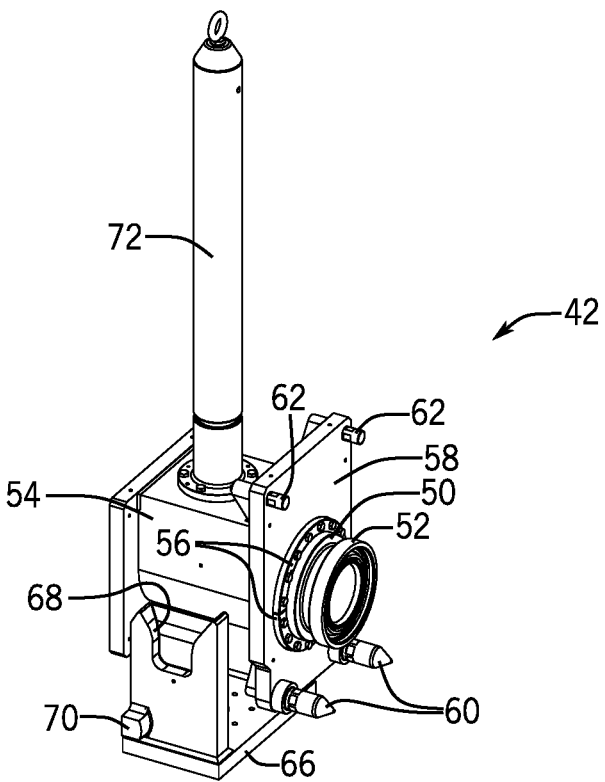

HORIZONTAL CONNECTOR SYSTEM AND METHOD

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

In order to meet consumer and industrial demand for natural resources, companies often invest significant amounts of time and money in searching for and extracting oil, natural gas, and other subterranean resources from the earth. Particularly, once a desired subterranean resource such as oil or natural gas is discovered, drilling and production systems are often employed to access and extract the resource. These systems may be located onshore or offshore depending on the location of a desired resource.

Offshore systems can include topside components positioned above the surface of the water, such as on a vessel or platform, and subsea components positioned underwater, such as on a seabed. Whether located subsea, topside, or onshore, components of drilling and production systems can be connected in fluid communication through various flowlines. A subsea system, for instance, may include a network of trees, manifolds, pumps, and other components positioned on a seabed and connected via subsea jumpers or other flowlines. Flowline connectors may be used to facilitate coupling of jumpers or other flowlines to trees, manifolds, and other components of drilling and production systems. In subsea contexts, a working vessel can be positioned above a subsea installation and a remotely operated vehicle (ROV) can be launched to travel to the subsea installation to facilitate coupling of jumpers to system components via flowline connectors.

SUMMARY

Certain aspects of some embodiments disclosed herein are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Certain embodiments of the present disclosure generally relate to connecting flowlines to manifolds, trees, or other components. In some embodiments, a flowline connector includes inboard and outboard assemblies that facilitate horizontal make-up of a fluid connection between a jumper and a subsea component. The inboard assembly can include an inboard pipe coupled to the subsea component and the outboard assembly can include an outboard pipe coupled to the jumper. During make-up of the flowline connector, the outboard pipe may be moved through a frame of the outboard assembly toward the inboard pipe. The outboard assembly may also include one or more guides that steer the outboard pipe toward alignment with the inboard pipe as the outboard pipe is moved through the frame. In some embodiments, these guides are provided on a profile pipe surrounding the outboard pipe. The flowline connector may also or instead include other alignment features, such as a landing porch of the outboard assembly having keys that are received within slots of a cradle of the inboard assembly, or a guide post and a guide funnel that facilitate landing of the outboard assembly with respect to the inboard assembly.

Various refinements of the features noted above may exist in relation to various aspects of the present embodiments. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of some embodiments without limitation to the claimed subject matter.

BRIEF DESCRIPTION OF THE DRAWINGS

These and other features, aspects, and advantages of certain embodiments will become better understood when the following detailed description is read with reference to the accompanying drawings in which like characters represent like parts throughout the drawings, wherein:

FIG. 3 is a perspective view of a horizontal flowline connector having an inboard assembly and an outboard assembly in accordance with one embodiment;

FIG. 4 is a perspective view of the inboard assembly of FIG. 3 in accordance with one embodiment;

DETAILED DESCRIPTION OF SPECIFIC EMBODIMENTS

Specific embodiments of the present disclosure are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements. Moreover, any use of "top," "bottom," "above," "below," other directional terms, and variations of these terms is made for convenience, but does not require any particular orientation of the components.

Figure 1:
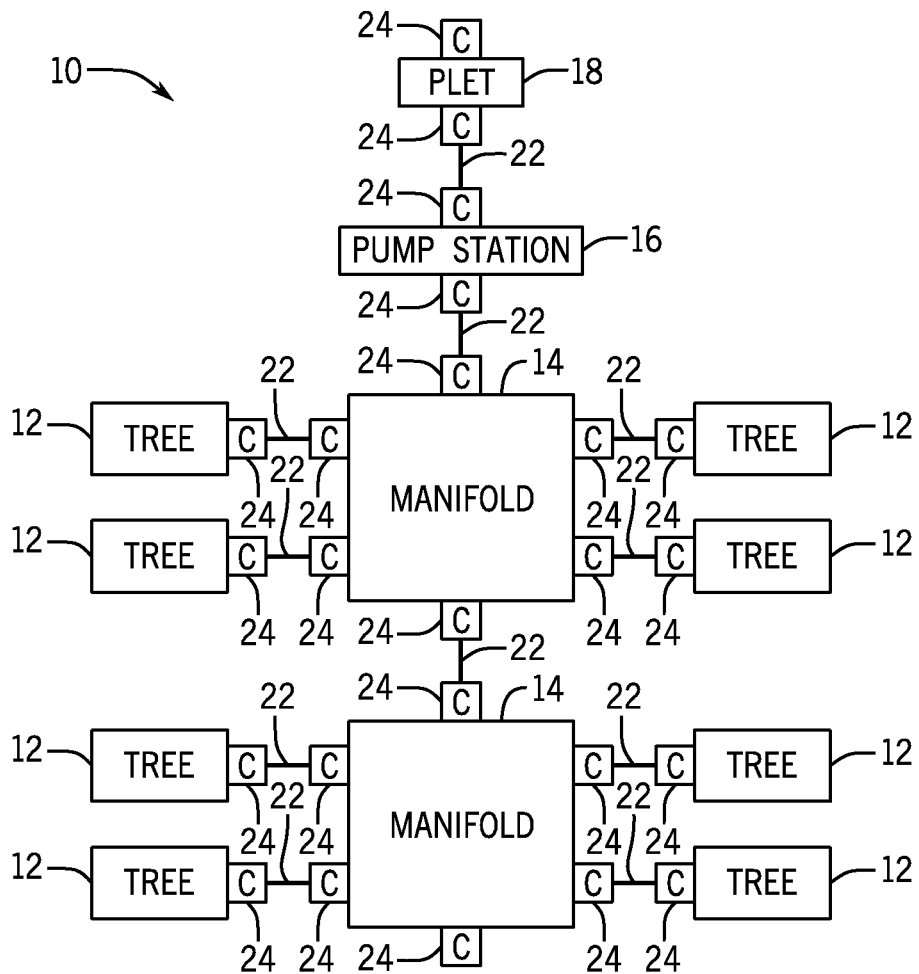
FIG. 1 generally depicts a production system with components coupled via flowlines and connectors in accordance with one embodiment.

Turning now to the present figures, an apparatus 10 is illustrated in FIG. 1 in accordance with one embodiment. The depicted apparatus 10 is a production system that facilitates extraction of a resource, such as oil or natural gas, from a subterranean reservoir. The apparatus 10 is generally shown in FIG. 1 as a subsea production system having trees 12 (e.g., production or injection trees) coupled to wellheads on a seabed. The trees 12, which can be horizontal trees or vertical trees, include valves for controlling fluid flow into and out of wells through the wellheads.

Reservoir fluid can be produced from the reservoir through the wellheads and the trees 12, which are connected to subsea manifolds 14 installed on the seabed. The manifolds 14 include valves to control flow of produced hydrocarbons or other fluids from or to the trees 12 through the manifolds 14. Produced fluid can also be routed from the manifolds 14 to processing equipment. For example, produced fluid may be routed to a pump station 16 for adding energy to the produced fluid and to a pipeline end termination (PLET) 18 or pipeline end manifold (PLEM) to facilitate delivery of the fluid through various flowlines or risers to some other location, such as a production platform, a floating production storage and offloading (FPSO) vessel, or an onshore processing facility.

The various components of the apparatus 10 are coupled in fluid communication via flowlines 22 (e.g., subsea jumpers) and associated connectors 24. The flowlines 22 may be provided as rigid or flexible flowlines that enable fluid to be conveyed between the trees 12, the manifolds 14, and other components of apparatus 10. While the various components of apparatus 10 are generally depicted as connected together by single flowlines 22 (e.g., each tree 12 to a manifold 14 by one flowline 22, the manifolds 14 connected to each other by one flowline 22, and the pump station 16 connected to a manifold 14 by one flowline 22), the number of flowlines 22 between any two components may vary in other embodiments. Multiple flowlines 22 may be used to couple a manifold 14 to the pump station 16 or to couple the pump station 16 to the PLET 18, for instance.

Although shown here as a subsea system, the apparatus 10 could take other forms in different embodiments, such as a topside system, an onshore system, or a system having any combination of subsea, topside, and onshore devices. It will be appreciated that the apparatus 10 can include various components in addition to or in place of those depicted in FIG. 1, and that some components noted above may be omitted in certain embodiments. Additional components may be connected to other components of the apparatus 10 via flowlines 22 and connectors 24.

Figure 2:
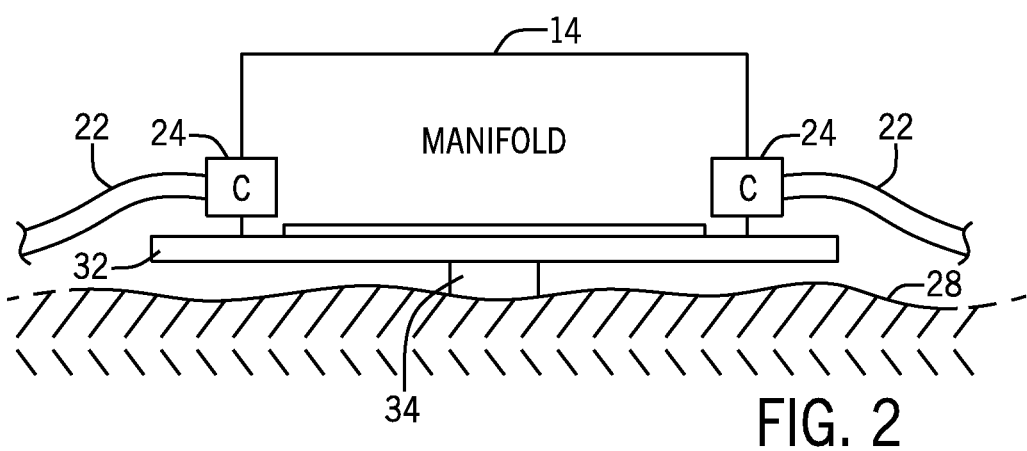
FIG. 2 generally depicts a subsea manifold coupled to a flowline by a flowline connector in accordance with one embodiment.

One example of an installed subsea manifold 14 of the apparatus 10 is generally depicted in FIG. 2. The manifold 14 is installed on a seabed 28 and connectors 24 facilitate coupling of the manifold 14 to other components (e.g., trees 12 or pump station 16) via flowlines 22. The manifold 14 is shown mounted on a substructure 32 coupled to a pile 34 embedded in the seabed 28. In other embodiments, multiple piles 34 may be used to support the manifold 14 via the substructure 32. In some instances, the substructure 32 and the one or more piles 34 are an integral foundation, while in other instances the substructure 32 is retrievable from the piles 34.

The connectors 24 can include inboard and outboard assemblies that facilitate make-up of a fluid connection between a flowline 22 and a tree 12, manifold 14, or other component of the apparatus 10. The form of the connectors 24 may vary between embodiments, and the connectors 24 within a given apparatus 10 may differ from each other. But one or more connectors 24 of the apparatus 10 may be provided in the form depicted in FIG. 3 in accordance with one embodiment.

As depicted in FIG. 3, a flowline connector 40 is a horizontal flowline connector including an inboard assembly 42 and an outboard assembly 44. The inboard assembly 42 can be mounted at least in part on a substructure 46 (e.g., the manifold substructure 32 or a substructure of some other component, such as a tree 12 or PLET 18) and generally represents a component side of the connector 40. The outboard assembly 44 can be landed on the inboard assembly 42 and generally represents a flowline side of the connector 40. That is, in at least one embodiment, the inboard assembly 42 is attached to the manifold 14, tree 12, PLET 18, or other component, the outboard assembly 44 is attached to a flowline 22, and the connector 40 operates to make-up a fluid connection between the flowline 22 and the component via the inboard and outboard assemblies 42 and 44. While the flowline connector 40 may be used to couple a jumper or other flowline 22 to a subsea component (e.g., a subsea tree or manifold), the flowline connector 40 may be used in other applications, such as for coupling surface components or pipelines.

The inboard assembly 42 of FIG. 3 is depicted alone in FIG. 4 for explanatory purposes and includes an inboard pipe 50 having an end hub 52. The inboard pipe 50 may be a part of, or connected to, the manifold 14 (or another component) that is to be connected to a flowline 22 via the connector 40. The inboard pipe 50 extends through a receiver structure 54, which may be attached to the manifold 14 or another component. The pipe 50 can be connected to the receiver structure 54 via a split ring 56 positioned within a groove of the pipe 50 (e.g., in a groove of the hub 52) and fastened to a plate 58 of the receiver structure 54. The inboard assembly 42 also includes guide pins 60 and bumpers 62 to facilitate alignment of a mating portion of the outboard assembly 44 during make-up of the connector 40, as discussed in greater detail below.

The receiver structure 54 is shown in FIGS. 3 and 4 within a cradle 66 of the inboard assembly 42. The cradle 66 can be attached to the substructure 46 for a component that is to be connected to a flowline 22 via the connector 40. The cradle 66 could be welded to the substructure 46 or attached in some other suitable manner. In at least some embodiments, including that depicted in FIGS. 3 and 4, the receiver structure 54 is held by the manifold 14 or other component supported by the substructure 46 and is received in the cradle 66 without being in contact with the cradle 66. The cradle 66 includes features to facilitate alignment of the outboard assembly 44 with the inboard assembly 42 during installation. More specifically, the cradle 66 includes slots 68 and bumpers 70 that engage mating features of the outboard assembly 44 to control horizontal alignment, pitch, and yaw of the outboard assembly 44 relative to the cradle 66. The inboard assembly 42 also includes a guide post 72 to facilitate landing of the outboard assembly 44. These alignment features and their functions are discussed in greater detail below.

Figure 5:
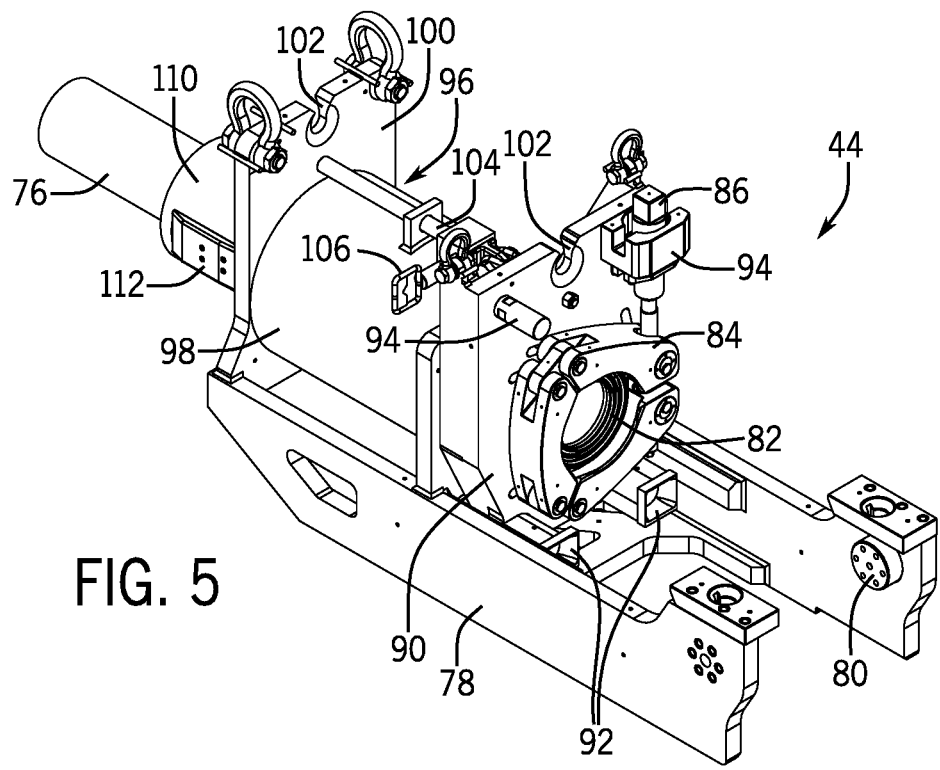
FIGS. 5 and 6 are perspective views of the outboard assembly of FIG. 3 in accordance with one embodiment.
Figure 6:
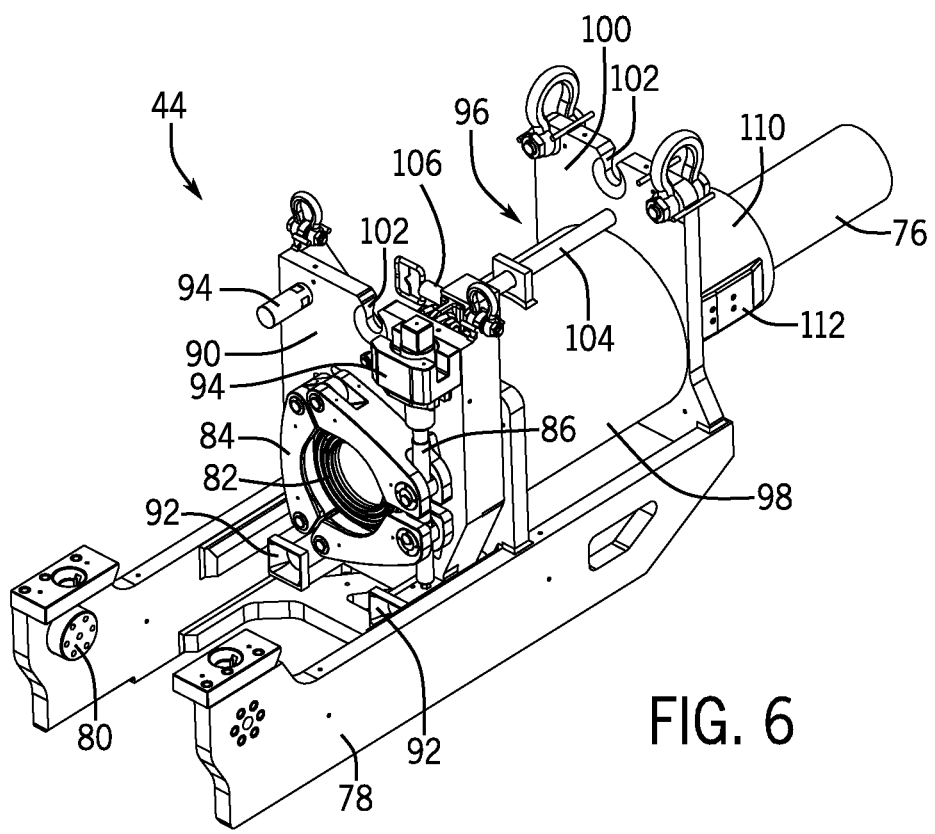
Figure 7:
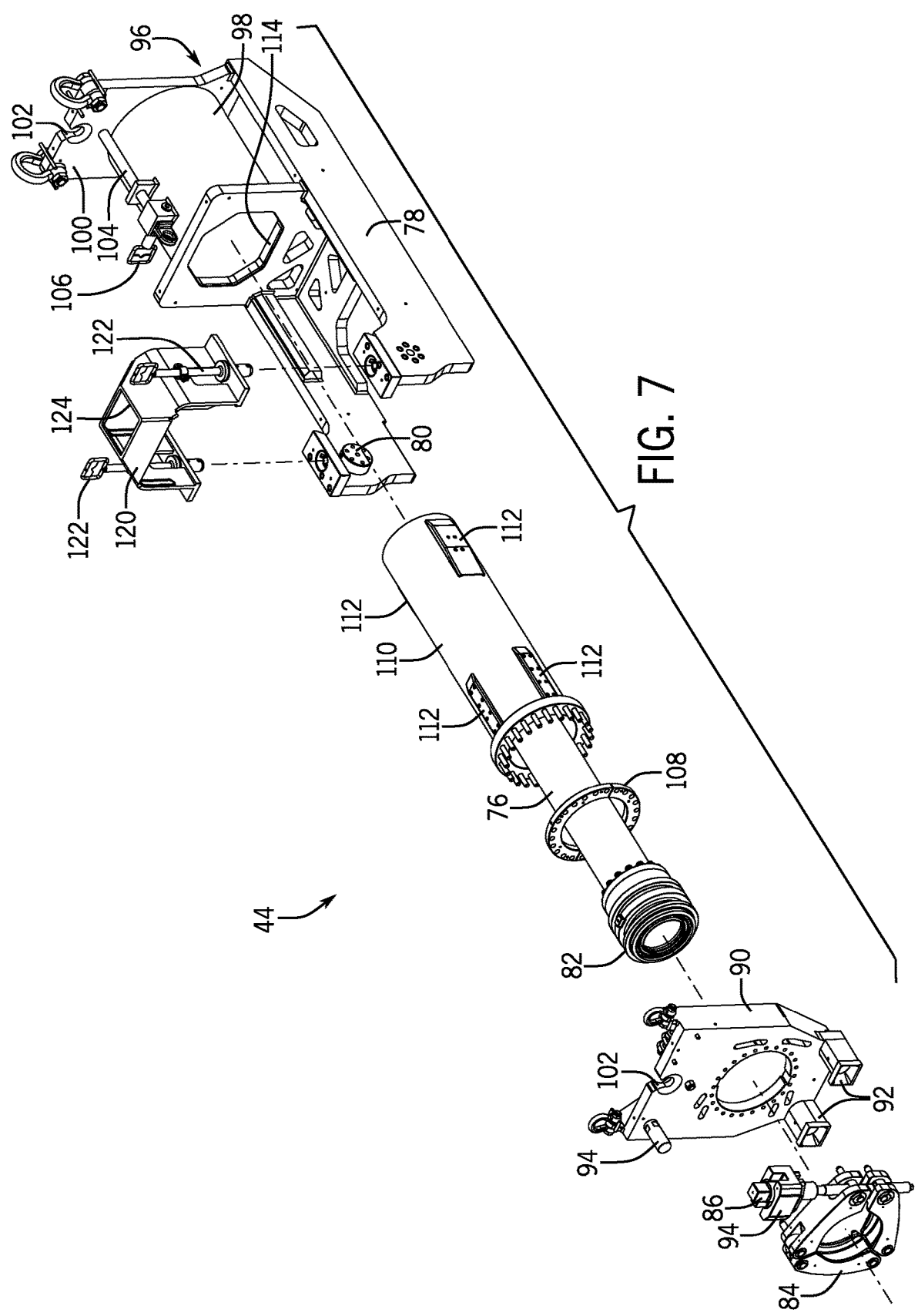
FIG. 7 is an exploded view of the outboard assembly of FIG. 3 in accordance with one embodiment.

The outboard assembly 44 of FIG. 3 is depicted without the inboard assembly 42 in FIGS. 5-7. The outboard assembly 44 includes an outboard pipe 76 having an end hub 82. The outboard pipe 76 is held by other structure of the outboard assembly 44, which includes a removable and retrievable subsea landing porch 78 that facilitates landing of the outboard assembly 44 next to the cradle 66 of the inboard assembly 42. More particularly, the depicted porch 78 includes arm portions with keys 80 that are received within the slots 68 of the cradle 66 as the outboard assembly 44 is landed. The keys 80 may have a rounded surface (e.g., the keys 80 may be provided with a cylindrical shape, such as the depicted puck shape in FIGS. 5-7) to avoid frictional binding and facilitate pitch changes of the porch 78 with respect to the cradle 66.

The depicted outboard assembly 44 also includes a clamp 84. In operation, make-up of the connector 40 includes moving the outboard pipe 76 toward the inboard pipe 50 and closing the clamp 84 about the hubs 52 and 82 of those pipes. A gasket or other seal may be provided between the hubs 52 and 82 to form a fluid-tight connection between the inboard pipe 50 and the outboard pipe 76 when the clamp 84 closes against the hubs 52 and 82. The depicted clamp 84 includes segments that are opened and closed about the hubs 52 and 82 by turning a leadscrew 86 (e.g., via an ROV). In other embodiments, the clamp 84 may take other forms and can be opened and closed in any suitable manner. Still further, in certain embodiments a collet connector could be used in place of the clamp 84.

In the depicted embodiment, the outboard pipe 76 is fastened to a supporting plate 90 of the outboard assembly 44 with a split ring 108 (FIG. 7) and the clamp 84 is mounted on the plate 90. Connecting the pipe 76 and the clamp 84 to a shared plate 90 may reduce cost and weight of the outboard assembly 44, but in other embodiments the pipe 76 and the clamp 84 may be attached to separate plates 90 (e.g., the pipe 76 connected to one supporting plate and the clamp 84 mounted on a different back plate). The shared supporting plate 90 may include features for holding and guiding the segments of the clamp 84. In other embodiments, the clamp 84 could instead be mounted on the inboard assembly, such as on plate 58.

The outboard assembly 44 also includes guide funnels 92 and bumpers 94, which extend from the plate 90 in FIGS. 5-7 and interface with the corresponding guide pins 60 and bumpers 62 of the inboard assembly 42 as the connector 40 is made-up by moving the plate 90 toward the inboard assembly 42. During make-up, the plate 90 (along with the connected outboard pipe 76 and clamp 84) is moved relative to a frame 96 of the outboard assembly 44. As presently illustrated, the frame 96 includes the porch 78, a barrel 98 positioned about the outboard pipe 76, and a rear plate 100. The rear plate 100 and the supporting plate 90 include grooves 102 for receiving a stroking tool (e.g., a hydraulic cylinder) that can be operated to push the supporting plate 90 away from the rear plate 100 when making up the connector 40 and to pull the supporting plate 90 back toward the rear plate 100 for disconnection.

A locking rod 104 and mating latch pin 106 may be provided for securing the supporting plate 90 at one or more specific locations with respect to the inboard assembly 42 and the frame 96. In some embodiments, for example, the locking rod 104 includes a generally cylindrical, elongate body that is connected to the plate 90 and is received in a groove of the transverse mating latch pin 106 such that the locking rod 104 travels through the groove of the pin 106 as the plate 90 moves with respect to the frame 96. The locking rod 104 can also include one or more grooves 118 (FIG. 14) for receiving the body (e.g., a cylindrical body) of the mating latch pin 106.

When the plate 90 is positioned at a given location such that a groove 118 of the locking rod 104 is located at the latch pin 106, the latch pin 106 can be rotated so that the body of the latch pin 106 enters the groove 118 and the receiving groove of the pin 106 is moved out of alignment with the travel path of the rod 104. The presence of the body of the latch pin 106 in the groove 118 blocks movement of the rod 104 and, thus, secures the supporting plate 90 (along with the connected outboard pipe 76 and clamp 84) in place relative to the frame 96. The grooves 118 may be positioned to facilitate parking of the outboard pipe 76 at particular locations, such as to provide one or more specific distances (e.g., 0.2-1 meter) between the opposing end faces of the hubs 52 and 82. In one embodiment, the locking rod 104 includes two grooves 118 for locking the outboard pipe 76 at locations that provide about 0.375 meters and about 0.5 meters (i.e., plus or minus ten percent for each) of separation between the end faces of the hubs 52 and 82, which may facilitate replacement of a gasket between the end faces, cleaning, or other maintenance operations.

The depicted outboard assembly 44 also includes a profile pipe 110 fastened or otherwise connected to the plate 90. The outboard pipe 76 is received in the profile pipe 110, and these two pipes move synchronously with the plate 90 during make-up of the flowline connector 40. The profile pipe 110 includes one or more guides 112 to facilitate alignment of the outboard pipe 76 (e.g., changing pitch or yaw) with the inboard pipe 50 during make-up. More specifically, in the presently depicted embodiment, the profile pipe 110 includes guides 112 for controlling pitch and yaw of the outboard pipe 76 as the plate 90 is moved toward the inboard assembly 42. As shown in FIG. 7, the guides 112 are ramped blocks fastened (e.g., with bolts) to an exterior of a cylindrical pipe body of the profile pipe 110. In at least one embodiment, however, the profile pipe 110 is omitted and the one or more guides 112 are provided directly on the outboard pipe 76.

One or more of the guides 112 may engage mating features of the frame 96 during make-up of the flowline connector 40 such that the mating features push the profile pipe 110 (which may also be referred to as a guide pipe) toward alignment with the inboard pipe 50. By way of example, and as discussed in greater detail below, these mating features may include sides of an aperture 114 (FIG. 7) of the frame 96 or mating guides or bumpers 116 (FIG. 9) of the frame 96. Although shown as fastened blocks, the guides 112 can take other forms. In some embodiments, for instance, the guides 112 may include one or more sloped ribs extending circumferentially about at least a portion of the profile pipe 110 (e.g., annular or arcuate ribs). Further, the guides 112 may be coupled to the main body of the profile pipe 110 in any suitable manner, such as with fasteners, welding, or being integrally formed with the main body.

Figure 8:
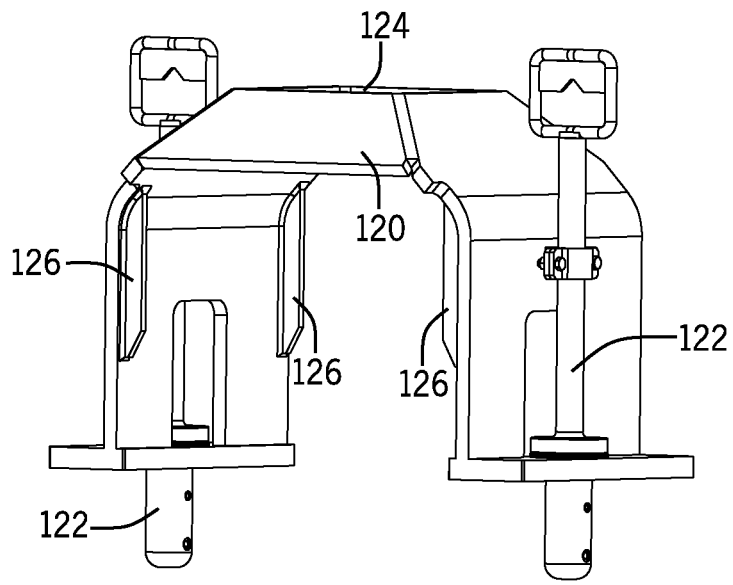
FIG. 8 shows a guide funnel of the outboard assembly of FIG. 3 in accordance with one embodiment.

In at least some embodiments, a guide funnel 120 may be used to facilitate landing of the outboard assembly 44 with respect to the cradle 66. One example of such a guide funnel 120 is shown connected to the porch 78 in FIG. 3 and is shown in greater detail in FIG. 8. In this depicted embodiment, the guide funnel 120 includes latches 122 for connecting to an end of the porch 78 above the rounded keys 80. The guide funnel 120 also includes an aperture 124, for receiving the guide post 72 of the inboard assembly 42, and tapered guide ribs 126.

Figure 9:
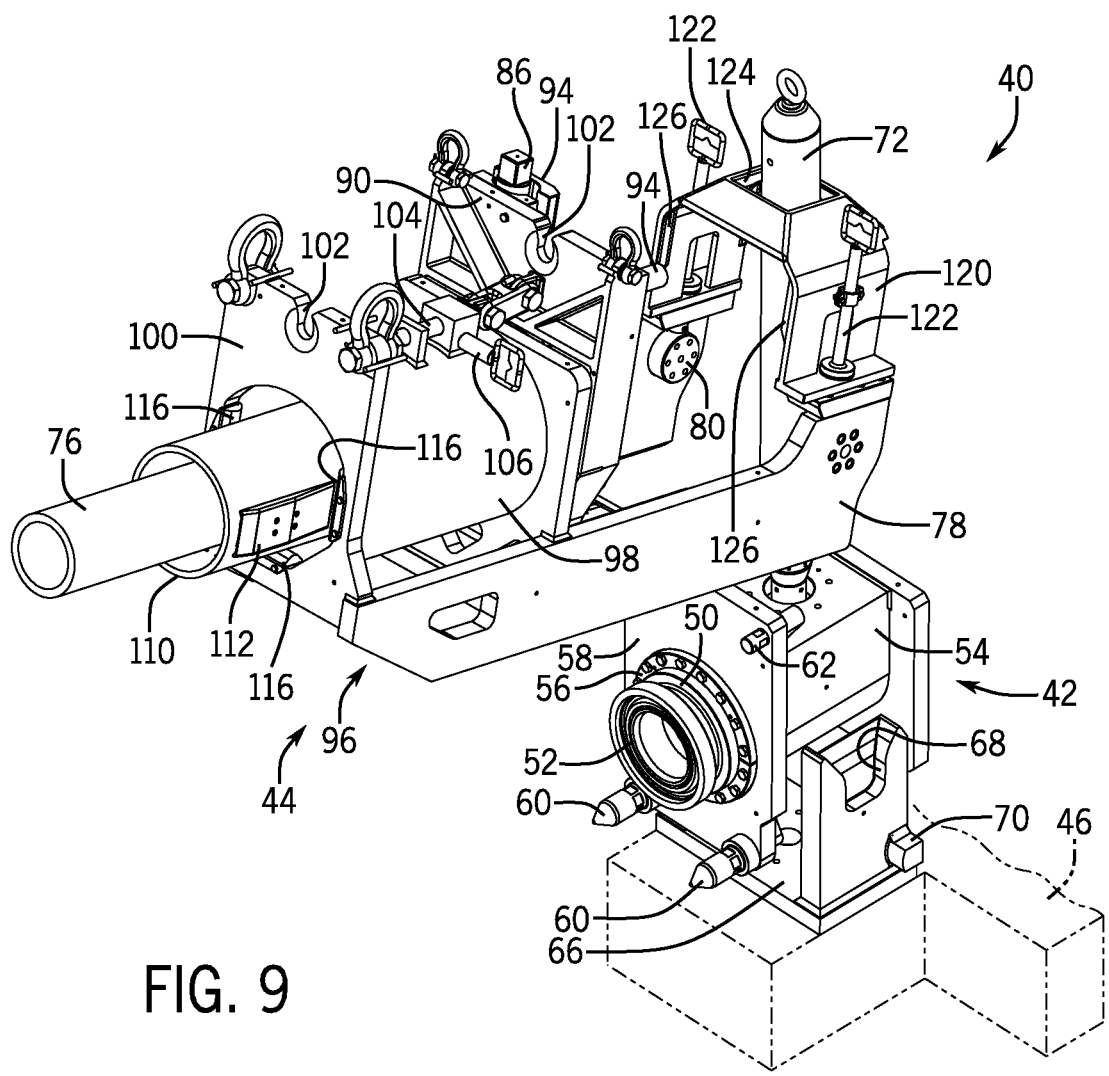
FIG. 9 generally depicts receipt of a guide post through an aperture of the guide funnel of FIG. 8 during landing of the outboard assembly in accordance with one embodiment.

As the outboard assembly 44 is lowered toward the cradle 66 during installation, such as shown in FIG. 9, the guide post 72 is received through the aperture 124 and guides the outboard assembly 44 as it descends. The funnel 120 can be turned about the post 72 to generally align the guide ribs 126 with sides of the receiver structure 54, after which the outboard assembly 44 can be landed as shown in FIG. 3. In this position, the receiver structure 54 is received between the guide ribs 126 and the keys 80 of the porch 78 are received in the mating slots 68 of the cradle 66. The tapered ends of the guide ribs 126 may engage the receiver structure 54 during landing to provide fine rotational (yaw) correction to the porch 78.

Figure 10:
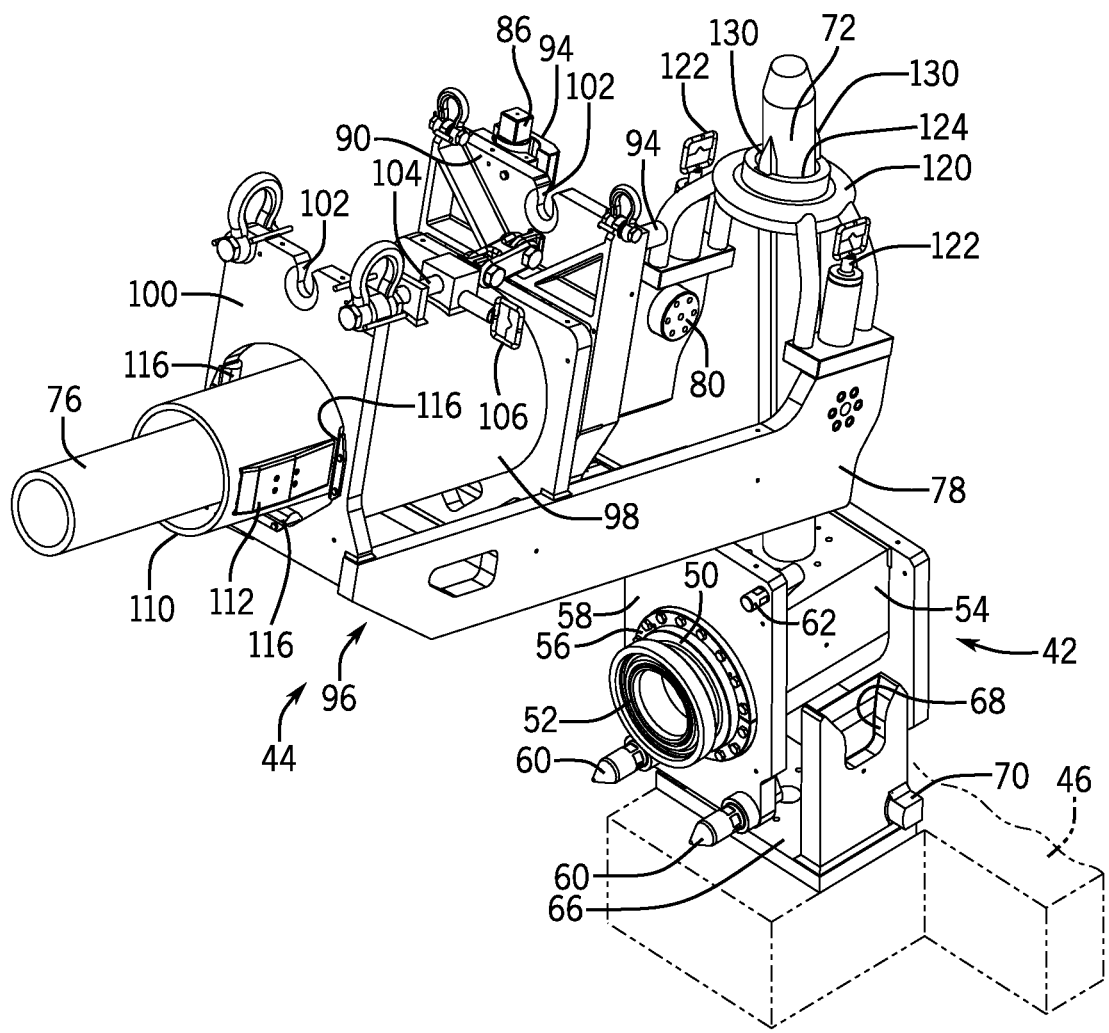
FIG. 10 generally depicts landing of the outboard assembly with respect to the inboard assembly using a guide post and a guide funnel sharing a keyed interface in accordance with one embodiment.
Figure 11:
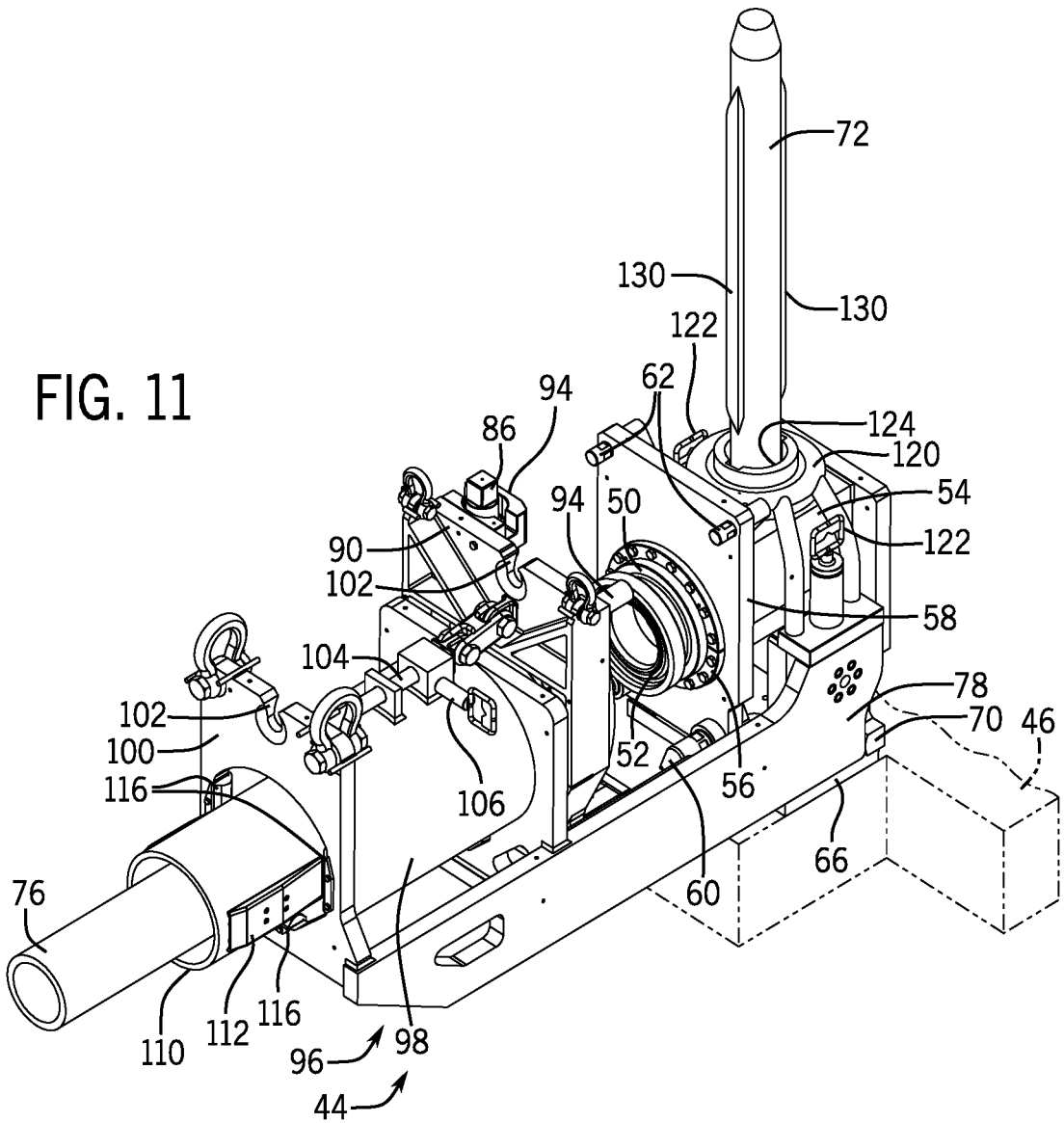
FIG. 11 generally depicts the outboard assembly of FIG. 10 in a landed position beside the inboard assembly in accordance with one embodiment.
Figure 12:
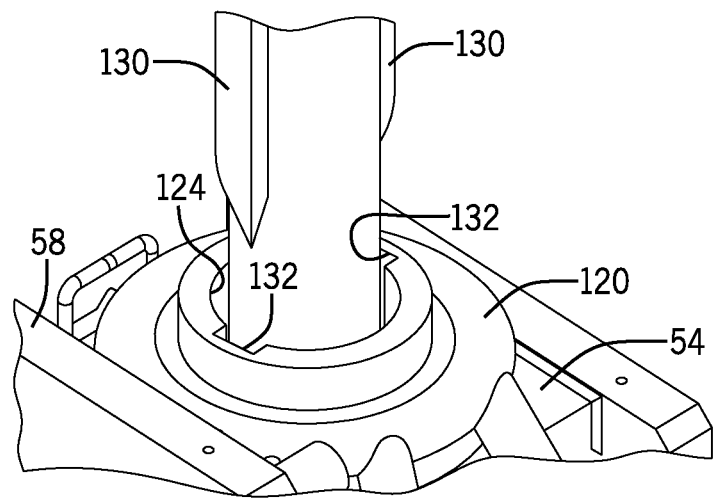
FIG. 12 is a detail view showing keys and keyways of the guide post and the guide funnel of FIGS. 10 and 11 in accordance with one embodiment.

In another embodiment depicted in FIGS. 10-12, the guide post 72 includes keys 130 to facilitate rotational alignment of the porch 78 with the cradle 66 during installation. In this embodiment, the guide funnel 120 includes keyways 132 (FIG. 12) for receiving the keys 130. More specifically, as shown in FIGS. 10 and 11, the upper ends of the keys 130 can be tapered to allow greater rotational misalignment between the porch 78 and the cradle 66 when the upper ends of the keys 130 are initially received in the keyways 132. The widths of the portions of the keys 130 received in the keyways 132 increase as the funnel 120 moves along the taper, and engagement of the keyways 132 with the tapered edges of the keys 130 can cause the porch 78 to further rotate toward alignment with the cradle 66. In one embodiment, for instance, the keys 130 and keyways 132 may allow an initial rotational (yaw) misalignment of the porch 78 of plus or minus ten to twenty degrees (e.g., plus or minus fifteen degrees) when the keys 130 begin to enter the keyways 132, and the taper of the keys 130 may steer the guide funnel 120 and the porch 78 to reduced misalignment of within plus or minus five degrees (e.g., plus or minus two degrees) relative to the cradle 66. Although two keys 130 are shown in FIGS. 10-12, other embodiments may have a single key 130 or more than two keys 130. Still further, the one or more keys 130 could be provided on the funnel 120 so as to be received in keyways 132 of the post 72.

Although the guide post 72 could be fixed to the receiver structure 54 in some instances, in at least some embodiments the guide post 72 may be installed with and removed from the receiver structure 54 as desired. For example, the guide post 72 could be installed on the receiver structure 54 for landing of the outboard assembly 44 and then removed. In another embodiment in which the outboard assembly 44 is to be landed next to the cradle 66 before the receiver structure 54 is received in the cradle 66 (e.g., before a manifold 14 having the receiver structure 54 is landed on the substructure 32), the guide post 72 may instead be installed on the cradle 66 (e.g., connected to a base of the cradle 66) to facilitate landing of the porch 78 into engagement with the cradle 66.

Figure 13:
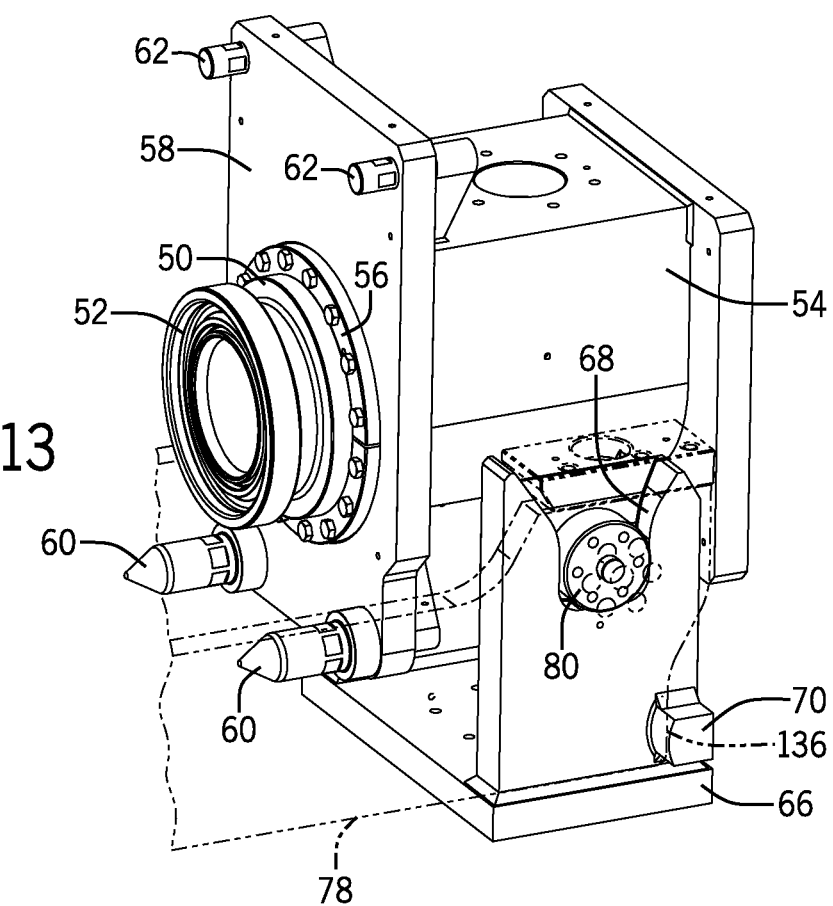
FIG. 13 shows rounded keys of the outboard assembly of FIG. 3 received in tapered slots of a cradle of the inboard assembly of FIG. 3 in accordance with one embodiment.

Engagement of the porch 78 with the cradle 66 may be better understood with reference to FIG. 13. Each of the keys 80 of the porch 78 is received in a mating slot 68 of the cradle 66. Each slot 68 may be tapered or otherwise shaped to guide a key 80 received during installation to the landed position depicted in FIG. 13; this generally controls the horizontal position and yaw of the porch 78 with respect to the cradle 66. The keys 80 in some embodiments are provided with a cylindrical shape that may generally avoid frictional locking during landing (such as from bending of an attached jumper 22) and facilitate installation.

Further, bumpers 70 provide positive pitch control to the outboard assembly 44 by engaging end surfaces 136 of the porch 78. That is, while the rounded surfaces of the keys 80 at the front end of the outboard assembly 44 in the slots 68 allow the tail end of the outboard assembly 44 to rise and fall (e.g., from a bending load of a connected jumper 22), bumpers 70 are positioned to provide a stop against movement of the porch 78 and an upper limit to pitch of the porch 78 relative to the cradle 66. In some embodiments, the bumpers 70 are positioned such that the porch 78 is oriented with a positive pitch of less than three degrees (i.e., the porch 78 is inclined slightly upwards toward the end having keys 80) when the end surfaces 136 of the porch 78 rest against the bumpers 70.

Figure 14:
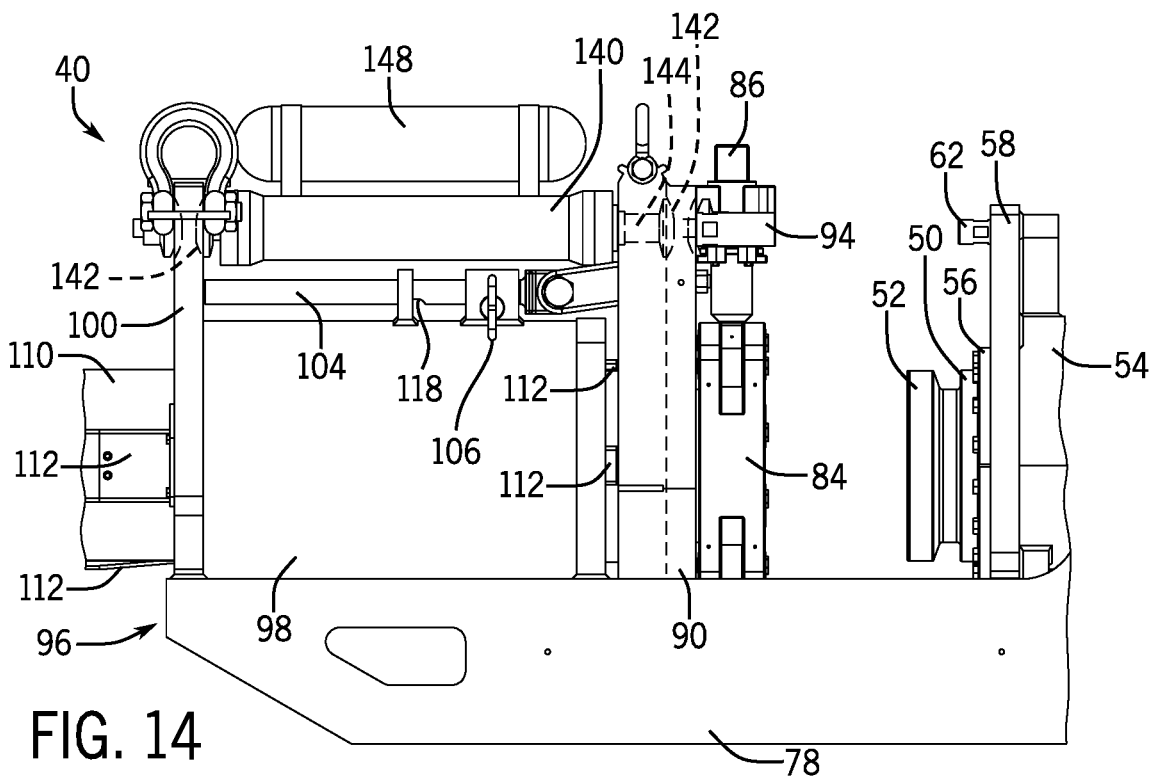
FIG. 14 is an elevational view of the flowline connector of FIG. 3 with an accumulator-assisted stroking tool for making-up the flowline connector in accordance with one embodiment.

As noted above, a stroking tool can be coupled to drive movement of the outboard pipe 76 toward the inboard pipe 50 to close the distance between the hubs 52 and 82 and facilitate make-up of the flowline connector 40. By way of example, a stroking tool 140 is shown in FIG. 14 coupled to the outboard assembly 44 between the plates 90 and 100. More specifically, ends 142 of the stroking tool 140 may be received in the grooves 102 of the plates 90 and 100. In certain embodiments, including that depicted in FIG. 14, the stroking tool 140 is attached to the outboard assembly 44 alone and does not interface with the inboard assembly 42. In this arrangement, the stroking tool 140 does not interfere with access to the hubs 52 and 82, which facilitates (e.g., via ROV) cleaning of these hubs and gasket retrieval or installation between the hubs without removing the stroking tool 140.

The depicted stroking tool 140 includes a rod 144 that can extend to push the plate 90 (along with the outboard pipe 76 and the profile pipe 110 connected to the plate 90) toward the inboard assembly 42 during make-up. In some embodiments, the stroking tool 140 is a hydraulic cylinder and the rod 144 is a piston rod that is controlled via hydraulic pressure. The stroking tool 140 may be an accumulator-assisted stroking tool, in which an accumulator 148 provides hydraulic pressure to the hydraulic cylinder. In some instances, an ROV may apply hydraulic pressure to the stroking tool 140 to push the plate 90 and move the outboard hub 82 toward the inboard hub 52. The ROV can then be disconnected from the stroking tool 140 and used to close the clamp 84 about the hubs 52 and 82 (e.g., by applying torque to leadscrew 86). The accumulator 148 can provide hydraulic pressure to the stroking tool 140 to resist jumper loading after the ROV is disconnected from the stroking tool 140 (e.g., as the ROV is actuating the clamp 84). Although depicted as a hydraulic cylinder in FIG. 14, the stroking tool 140 may take any other suitable form, such as an electric actuator.

Figure 15:
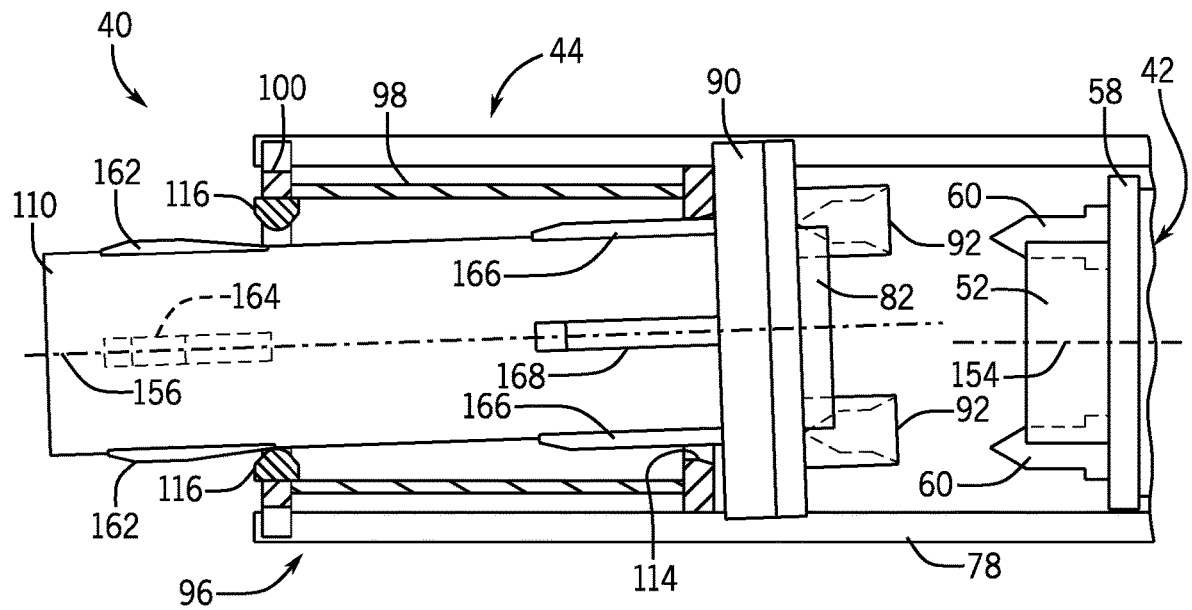
FIGS. 15-22 are schematic views generally depicting a make-up sequence of the flowline connector of FIG. 3 in accordance with one embodiment.
Figure 16:
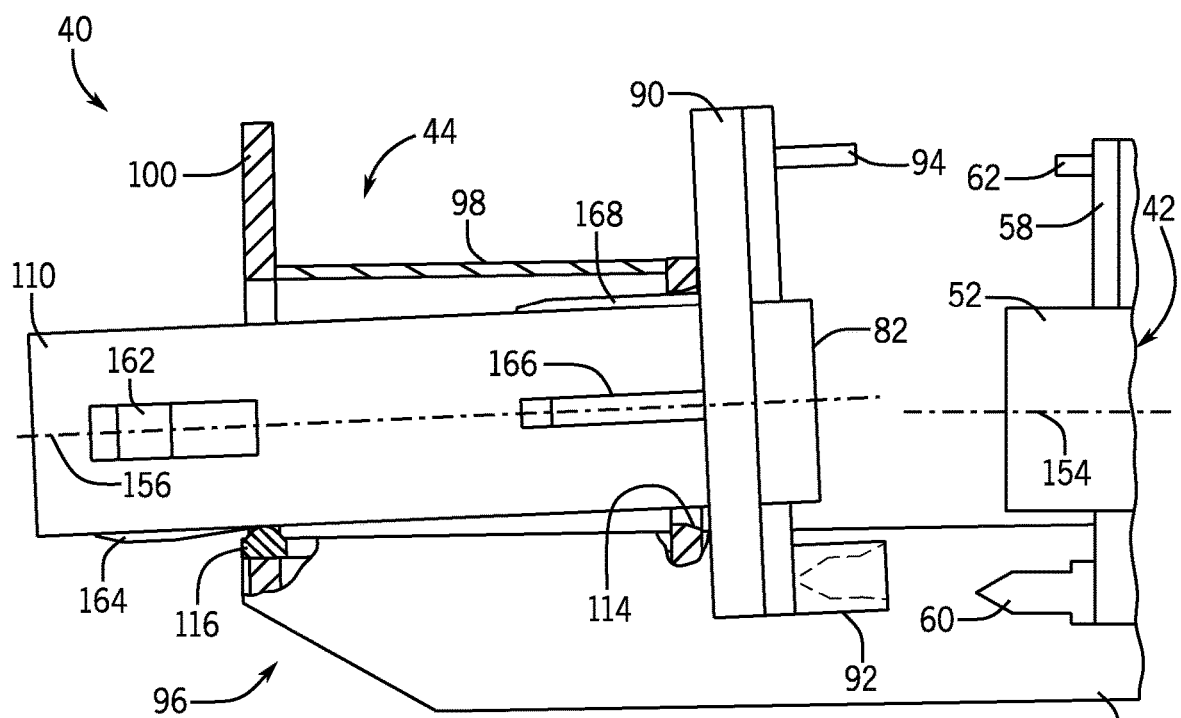
Figure 17:
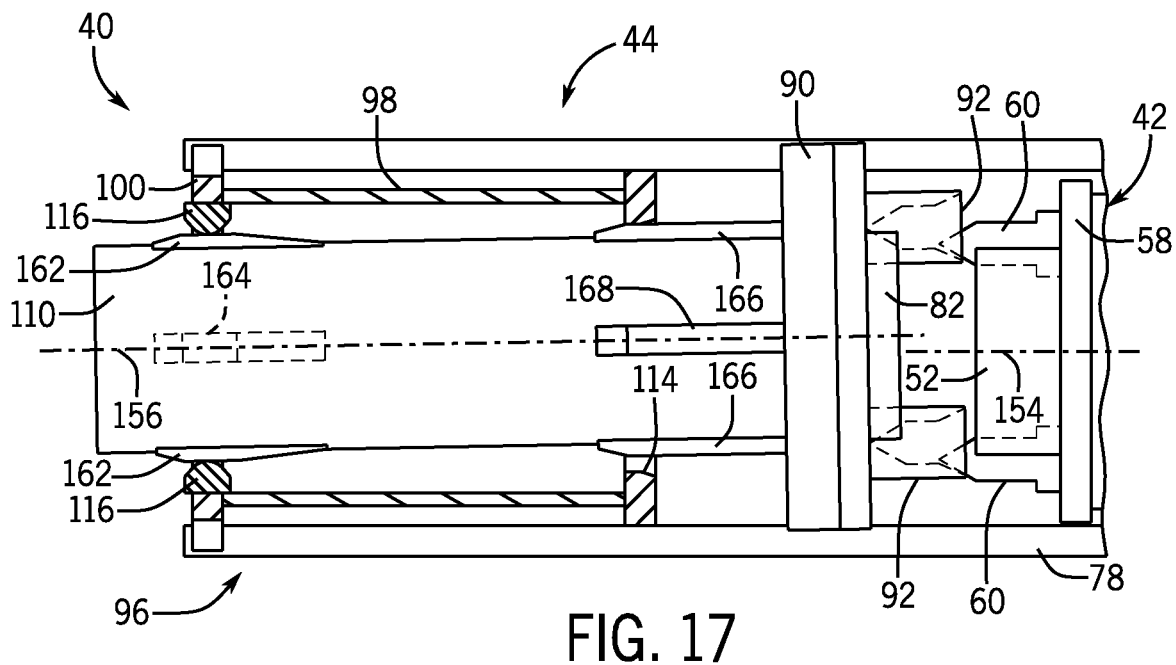
Figure 18:
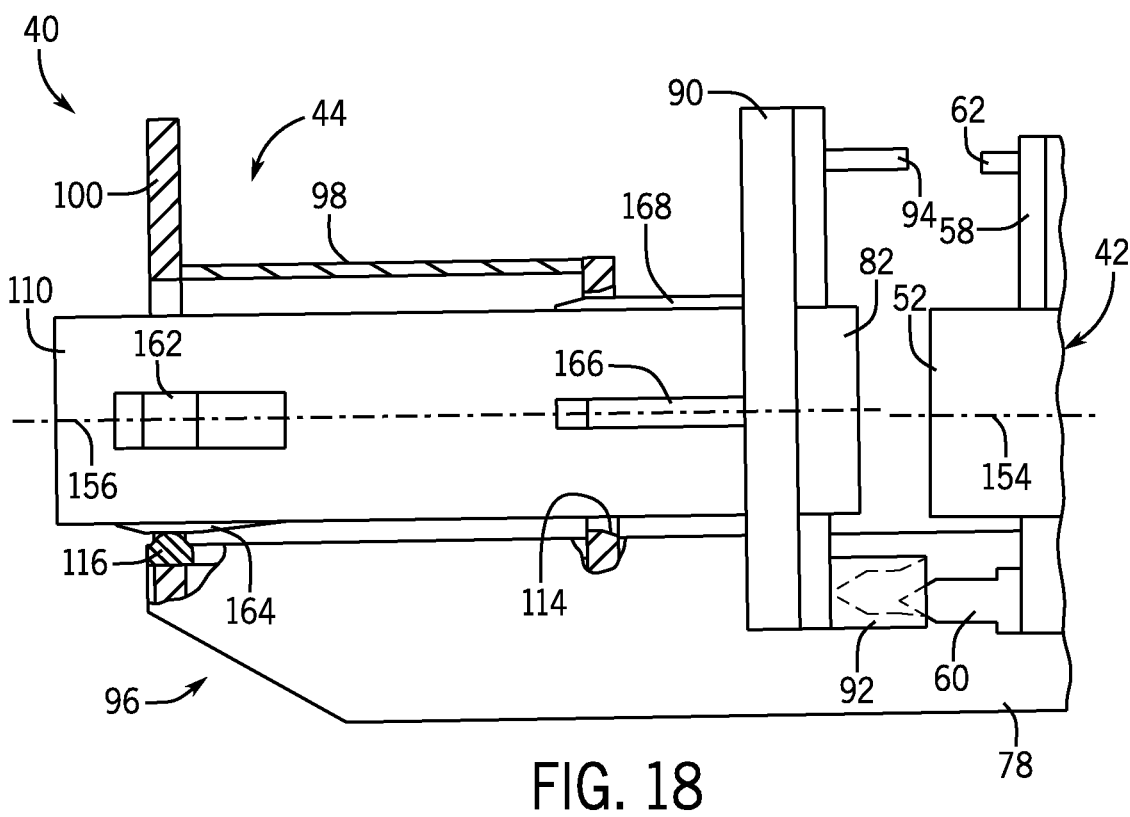
Figure 19:
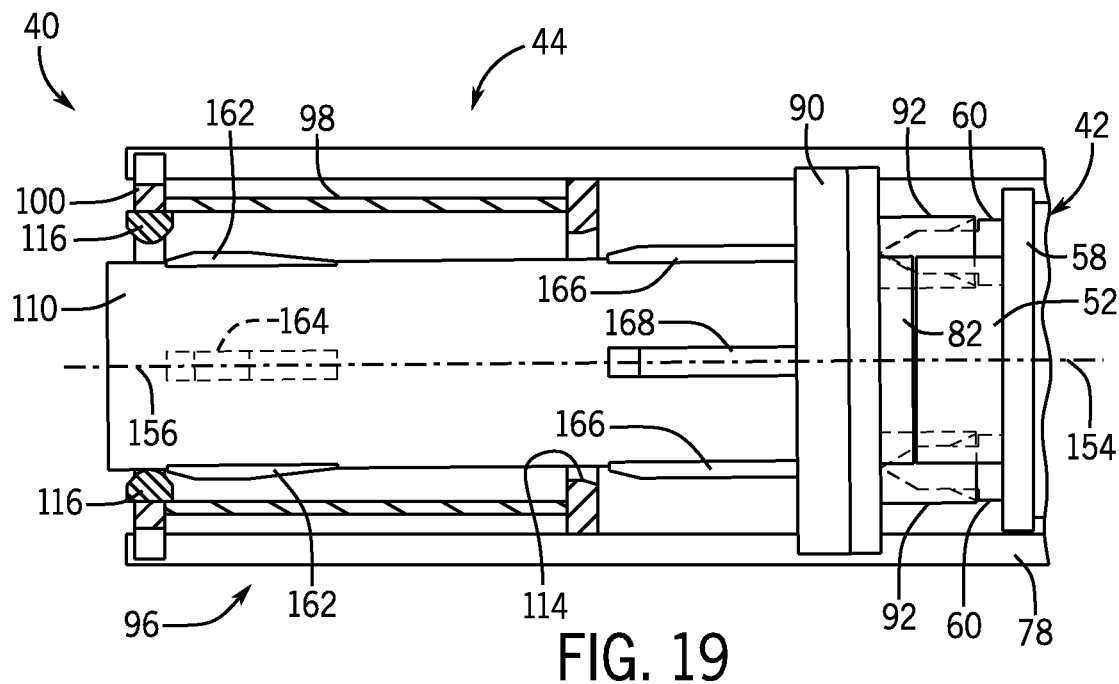
Figure 20:
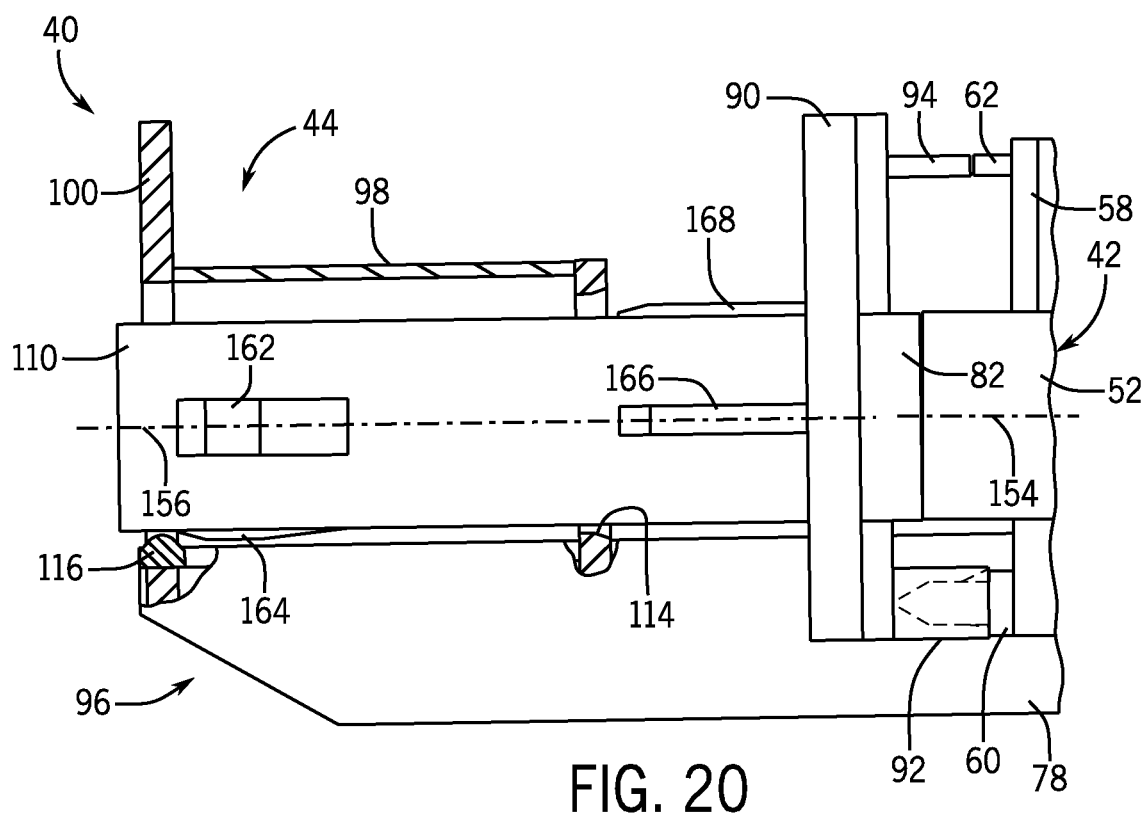
Figure 21:
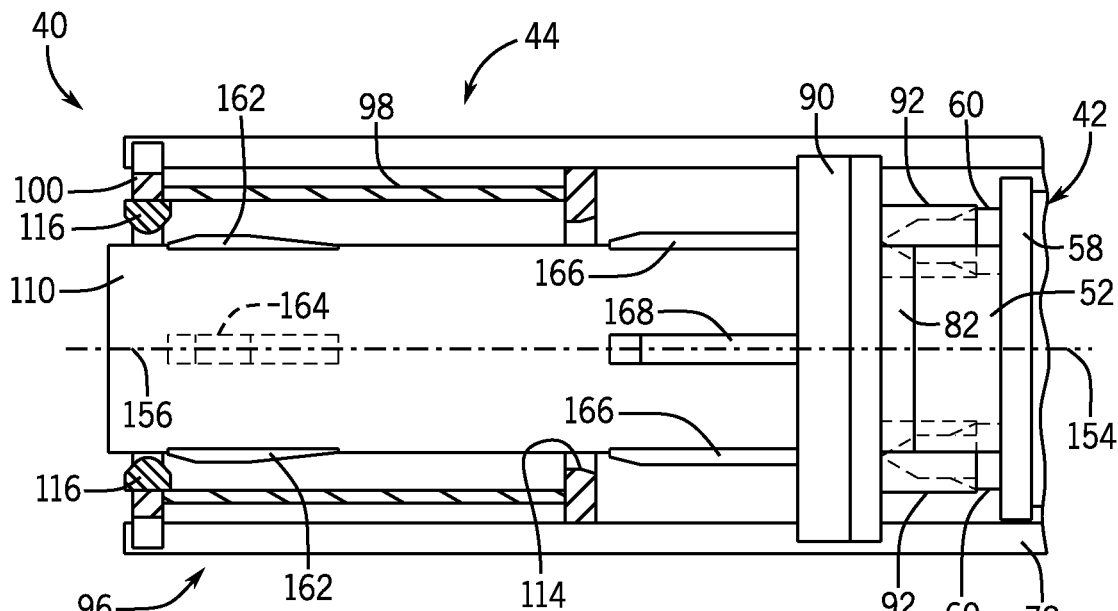
Figure 22:
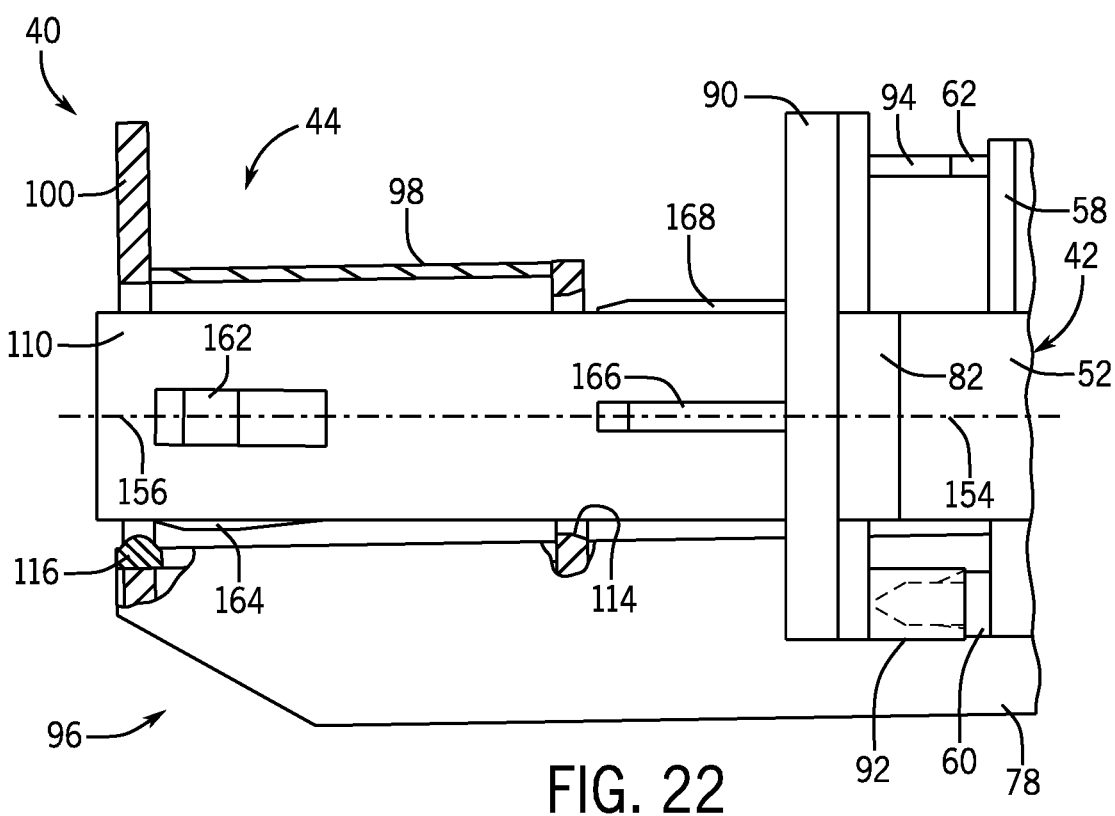

As noted, the profile pipe 110 may guide alignment of the outboard pipe 76 with the inboard pipe 50 during make-up of the flowline connector 40. For illustrative purposes, a make-up sequence for the flowline connector 40 is generally depicted in FIGS. 15-22. Some features of the connector 40 have been omitted from these figures for clarity and to better show movement of the hub 82 (of the outboard pipe 76) into alignment with the hub 52 (of the inboard pipe 50) during make-up. More specifically, FIGS. 15 and 16 are schematic plan and elevational views, respectively, of the connector 40 in a disconnected state at a first time, with the plate 90 retracted away from the inboard assembly 42 and the hubs 52 and 82 apart. FIGS. 17 and 18 are schematic plan and elevational views showing the connector 40 at a second time as the plate 90, the profile pipe 110, and the hub 82 are moved toward the hub 52. FIGS. 19 and 20 are schematic plan and elevational views showing the connector 40 at a third time as the plate 90, the profile pipe 110, and the hub 82 have been moved still closer to the hub 52; and FIGS. 21 and 22 are schematic plan and elevational views showing the connector 40 at a subsequent fourth time in which the hubs 52 and 82 are aligned.

In the disconnected state of the connector 40 shown in FIGS. 15 and 16, the hub 82 of the outboard pipe 76 and the profile pipe 110 are misaligned with respect to the hub 52 of the inboard pipe 50. That is, a longitudinal axis 156 of the hub 82 and profile pipe 110 is not aligned with a longitudinal axis 154 of the hub 52. FIG. 15 depicts the hub 82 and profile pipe 110 having a yaw out of alignment with the hub 52, while FIG. 16 depicts the hub 82 and profile pipe 110 having a pitch out of alignment with the hub 52. As noted above, the profile pipe 110 can include one or more guides 112 to facilitate alignment of the outboard pipe 76 and its hub 82 with the inboard pipe 50 and its hub 52. In FIGS. 15 and 16, these guides 112 are provided in the form of side guides 162 and a bottom guide 164 at the tail end (distal from plate 90) of the profile pipe 110 and side guides 166 and a top guide 168 at the front end of the profile pipe 110. These guides 162, 164, 166, and 168 protrude radially from the elongate body (e.g., cylindrical body) of the profile pipe 110 and can be formed integrally with the elongate body or be attached to the elongate body in any suitable manner.

As the plate 90, profile pipe 110, and hub 82 are moved toward the hub 52 (e.g., such as by pushing the plate 90 toward the hub 52 with the stroking tool 140), one or more of the guides 162, 164, 166, or 168 can change the yaw or pitch of the profile pipe 110 and the outboard pipe 76 having the hub 82 to direct these components toward alignment with the inboard pipe 50 having the hub 52. For example, as the plate 90 is moved from the position shown in FIGS. 15 and 16 toward that shown in FIGS. 17 and 18, the profile pipe 110 is drawn through the barrel 98 (with the outboard pipe 76 inside the profile pipe 110) such that one of the side guides 162 and the bottom guide 164 contact mating bumpers 116 of the frame 96. As a radially projecting side guide 162 engages and moves along a mating bumper 116 (e.g., as shown in FIG. 17), the bumper 116 pushes the tail end of the profile pipe 110 to rotate the profile pipe 110 (and the outboard pipe 76, via the plate 90) toward alignment with the hub 52 of inboard pipe 50. That is, mating engagement of a side guide 162 with a mating bumper 116 changes the yaw of the profile pipe 110 and the outboard pipe 76 toward alignment with the inboard pipe 50. Similarly, as the bottom guide 164 engages a mating bumper 116 (e.g., as shown in FIG. 18), the mating bumper 116 pushes the tail end of the profile pipe 110 upward, which causes the pitch of the profile pipe 110 and the outboard pipe 76 to change toward alignment with the inboard pipe 50. As the guides 162 and 164 push the tail end of the profile pipe 110 toward alignment through engagement with the bumpers 116, the guides 166 and 168 may engage the surface of the frame 96 defining the aperture 114 to push the front end of the profile pipe 110 (along with the plate 90 and the outboard pipe 76) toward alignment with the inboard pipe 50. The use of guides 162, 164, 166, and 168 to help align the hubs 52 and 82 during make-up may provide the flowline connector 40 with increased yaw and pitch tolerances, allowing for greater initial misalignment of the outboard pipe 76 with respect to the inboard pipe 50. This in turn may facilitate manufacturing and reduce costs, such as by allowing looser tolerances for machining.

At the position depicted in FIGS. 17 and 18, the guide funnels 92 have received ends of the guide pins 60. Interaction between the guide funnels 92 and the guide pins 60 may further guide the profile pipe 110 and the outboard pipe 76 toward alignment with the inboard pipe 50 as the plate 90, the profile pipe 110, and the outboard pipe 76 continue to move toward the position depicted in FIGS. 19 and 20. That is, engagement between the guide funnels 92 and the guide pins 60 can help correct yaw and pitch alignment of the outboard pipe 76 with respect to the inboard pipe 50. And with contact between the hubs 52 and 82 in FIGS. 19 and 20, continued driving of the plate 90 toward the hub 52 (or closing of the clamp 84 about the hubs 52 and 82) can further rotate the outboard pipe 76 (with hub 82) and the profile pipe 110 into alignment with the hub 52, as shown in FIGS. 21 and 22.

While the aspects of the present disclosure may be susceptible to various modifications and alternative forms, specific embodiments have been shown by way of example in the drawings and have been described in detail herein. But it should be understood that the invention is not intended to be limited to the particular forms disclosed. Rather, the invention is to cover all modifications, equivalents, and alternatives falling within the spirit and scope of the invention as defined by the following appended claims.

The invention claimed is:
1. An apparatus comprising:
a flowline connector including an inboard pipe and an outboard assembly, the outboard assembly including an outboard pipe supported within a frame such that the outboard pipe is moveable within the frame to allow the outboard pipe to be moved toward the inboard pipe, wherein the outboard assembly also includes a profile pipe in which the outboard pipe is received, the profile pipe and the outboard pipe are connected to move synchronously, and the profile pipe includes at least one guide to change pitch or yaw of the outboard pipe to direct the outboard pipe toward alignment with the inboard pipe as the outboard pipe is moved within the frame toward the inboard pipe;
wherein the flowline connector includes an inboard assembly having the inboard pipe, wherein the outboard assembly includes a landing porch with rounded keys configured to be received in mating slots of the inboard assembly.
2. The apparatus of claim 1, wherein the at least one guide is fastened to the profile pipe.
3. The apparatus of claim 2, wherein the at least one guide includes a first guide that is fastened to the profile pipe and positioned to change the yaw of the outboard pipe to direct the outboard pipe toward alignment with the inboard pipe as the outboard pipe is moved within the frame toward the inboard pipe and a second guide that is fastened to the profile pipe and positioned to change the pitch of the outboard pipe to direct the outboard pipe toward alignment with the inboard pipe as the outboard pipe is moved within the frame toward the inboard pipe.

4. The apparatus of claim 1, wherein the inboard assembly includes a guide post and the outboard assembly includes a guide funnel with an aperture to receive the guide post.

5. The apparatus of claim 4, wherein the guide post and the guide funnel share a keyed interface.

6. The apparatus of claim 1, comprising a stroking tool coupled to drive movement of the outboard pipe toward the inboard pipe.

7. The apparatus of claim 6, wherein the stroking tool is an accumulator-assisted stroking tool.

8. The apparatus of claim 1, wherein the inboard assembly includes a cradle that receives the inboard pipe and has the mating slots.

9. The apparatus of claim 1, wherein the inboard assembly includes a bumper positioned to engage the landing porch and limit positive pitch of the outboard pipe when the rounded keys are received in the mating slots of the inboard assembly.

10. A method of coupling a first pipe and a second pipe in fluid communication, the method comprising:
positioning the first pipe with respect to the second pipe such that the first pipe is spaced apart from the second pipe and is not axially aligned with the second pipe;
moving the first pipe toward the second pipe, wherein moving the first pipe toward the second pipe includes drawing at least one radially protruding guide moving with the first pipe along a frame so as to rotate the first pipe toward axial alignment with the second pipe; and
securing the first and second pipes in fluid communication
wherein drawing the at least one radially protruding guide along the frame so as to rotate the first pipe toward axial alignment with the second pipe includes drawing the at least one radially protruding guide along the frame so as to change pitch and yaw of the first pipe.

11. The method of claim 10, wherein the at least one radially protruding guide includes at least two radially protruding guides on an additional pipe that surrounds and moves with the first pipe.

12. The method of claim 10, comprising landing an outboard assembly having the first pipe next to an inboard assembly having the second pipe, wherein landing the outboard assembly next to the inboard assembly includes lowering keys of the outboard assembly into tapered slots of the inboard assembly.

13. The method of claim 10, wherein moving the first pipe toward the second pipe includes actuating a stroking tool mounted on the frame to push the first pipe toward the second pipe.

* * * * *